Patented Oct. 6, 1925.

1,556,039

UNITED STATES PATENT OFFICE.

HERBERT M. SHILSTONE, OF NEW ORLEANS, LOUISIANA.

DECOLORIZING CARBON AND PROCESS OF PRODUCING THE SAME.

No Drawing.   Application filed May 31, 1917. Serial No. 172,123.

*To all whom it may concern:*

Be it known that I, HERBERT M. SHILSTONE, a subject of the King of Great Britain, residing at New Orleans, in the parish of Orleans and State of Louisiana, have invented certain new and useful Improvements in Decolorizing Carbons and Processes of Producing the Same; and I do hereby declare the following to be a full, clear, and exact description of the invention, such as will enable others skilled in the art to which it appertains to make and use the same.

This invention relates to decolorizing carbons and processes of producing the same and has for its object to provide a carbonaceous material which will be comparatively inexpensive to produce and which will be more efficient in use than those heretofore proposed.

With these and other objects in view the invention consists in the novel product and in the novel steps and combinations of steps constituting the process for producing said product all as will be more fully hereinafter disclosed and particularly pointed out in the claims.

In order that my invention may be the more easily understood it is said:—

Heretofore it has been proposed to produce carbons for decolorizing cane juice, and other liquids from wood charcoal and bone black, but all these prior carbons have been proved by actual trial to be limited in their efficiency.

In carrying out this invention, I preferably take rice hulls, rice straw or rice chaff, and heat them in a closed chamber, out of contact with free oxygen, to a temperature sufficient to carbonize the same, whereupon the charred product is treated with an alkali solution to dissolve out the resinous matter present.

In order to make a superior product I find it convenient to first gradually heat the fibrous mass to drive off the resinous vapors, and it produces a structure which may be then carbonized without destroying its integrity upon raising the temperature. The mass thus treated is next preferably ground or otherwise finely subdivided when it may be boiled for say thirty minutes in an alkali solution, such as sodium hydrate, in order to dissolve out any resinous or other objectionable matters that may still remain in the cells.

The mass may now be washed in order to remove the alkali whereupon it may then be conveniently boiled for say five or ten minutes in a dilute solution of hydrochloric acid to remove the last traces of the alkali. The carboniferous mass or material resulting from the foregoing procedure can be used without further preparation for clarifying saccharine solutions and other liquids, but if it is desired to transport or to store the same, it should be dried in a suitable apparatus. The carbonaceous product produced by the foregoing process for reasons which I cannot satisfactorily explain is found to be unusually porous and more active as a decolorizer for saccharine solutions, cane juices, oils, and other liquids containing coloring matter than any similar product with which I am acquainted.

Whatever may be the real explanation of the superiority of carbonized fibrous rice material over other decolorizing carbons, it is a fact that in actual use in addition to said decolorizing superiority when decolorizing cane juice, for example, it shows itself to possess a marked superiority in removing the polyphenols or tannins present over both the animal and vegetable charcoals now on the market.

I have further discovered that the physical properties of fibrous rice material peculiarly fit it for the carbonizing process. That is to say, this said material after being carbonized, treated and dried as above outlined shows upon analysis that it contains silica which I have reason to believe forms a firm foundation, framework or structure for holding the particles of carbon in place. The amount of this silica, of course, will vary with the strength of the caustic solution employed and the time of boiling the same. It may form a compound of a weight more than 40% of the weight of the product or it may form a compound whose weight is more than 25% of the weight of the product or an analysis may show that the product is associated with more than 15% of its weight of silica.

I have further found that when only relatively small quantities of this said rice material is employed, it is so efficient in its decolorizing action and in removing the above mentioned polyphenols or tannins from cane juices, that these said juices will not discolor on standing nor upon the addition of iron salts, a result I have not been able to approach when using the same proportions of other carbons.

Again, I have observed a marked difference in the action of this said rice decolorizing carbon over other carbons, in the following particulars:—In using other carbons successfully the saccharine solutions to be decolorized must be acid in character, whereas in the use of my rice carbon, I have found that said solutions can be neutral or even alkaline as well as acid in character and still decolorize them perfectly.

This property of my rice carbon constitutes a very great advantage which will be appreciated when it is remembered that the neutral condition is the ideal one for crystallization processes, and when it is remembered that acid solutions give rise on the one hand to inversion and to the formation of large amounts of molasses, while alkaline solutions, on the other hand, give rise to the destruction of the sugars and the formation of organic acids all as is well known.

It is obvious that those skilled in the art may vary the details of the process as well as the minor characteristics or physical properties of the product, without departing from the spirit of the invention, and therefore, I do not wish to be limited to the above disclosure except as may be required by the claims.

What I claim is:—

1. The process for producing a carbonaceous material for decolorizing liquids which consists in partially burning to a charred mass fibrous rice material containing silica, treating the charred material after cooling with an alkali under such conditions as will produce a porous mass, and removing the residual alkali from the mass, such charring and treatment with alkali being so conducted as to leave a final product substantially free of resinous substances.

2. The herein described new decolorizing carbonaceous product comprising charred fibrous rice material, from which product a material proportion of alkali-soluble constituents including substantially all the resinous matter has been removed, but which has present at least a substantial portion of its original silica content sufficient to form a support for the carbon present, substantially as described.

3. The process of producing a carbonaceous material for decolorizing liquids which consists in heating out of contact with the air fibrous rice material containing silica until a portion only of the resinous matter present is driven off and its cellulose constituents are carbonized; removing the remainder of the resinous matter by treatment with an alkali under such conditions as will produce a porous mass; and removing the alkali remaining in said mass, substantially as described.

4. The herein described new decolorizing carbonaceous product comprising the charred cellulose constituents of fibrous rice material containing substantially all of its original carbon from all of which material substantially all the resinous matter has been removed, and which has present a substantial portion of its silica to form a support for the carbon present, substantially as described.

5. The herein described new article of manufacture consisting of a decolorizing carbonaceous material containing the charred cellulose constituents of fibrous rice material from which the resinous matter has been removed and provided with a supporting material containing silica, substantially as described.

6. The herein described new article of manufacture comprising a decolorizing carbonaceous material containing the charred cellulose constituents of fibrous rice material from which the resinous matter has been removed and associated with more than 15% of its weight of silica, substantially as described.

7. The herein described new decolorizing carbonaceous product comprising the charred cellulose constituents of fibrous rice material from which substantially all the resinous matter has been removed and possessing a high degree of porosity, substantially as described.

8. The herein described new decolorizing carbonaceous product more than 40% of the weight of which is a compound of silicon, said product comprising the charred cellulose constituents of fibrous rice material from which the resinous matter has been removed and possessing a high degree of porosity, substantially as described.

9. The herein described new article of manufacture consisting of a decolorizing carbonaceous material more than 25% of the weight of which is a silicon compound, and containing the charred cellulose constituents of fibrous rice material from which the resinous matter has been removed, substantially as described.

10. The process of producing a carbonaceous material for decolorzing liquids which consists in heating fibrous rice material containing silica to drive off a portion of the resinous matter present and to carbonize its cellulose constituents; and removing the remainder of said resinous matter to form a highly porous mass, substantially as described.

11. The process of producing a carbonaceous material for decolorizing liquids which consists in heating fibrous rice material containing silica at different temperatures to drive off a portion of the resinous matter present and to carbonize its cellulose constituents; removing the remainder of said resinous matter by treatment with an alkaline solution to form a highly porous mass; and removing the alkali remaining in said mass, substantially as described.

12. The process of facilitating the recovery of sugar from saccharine juices which consists in subjecting said juices to the filtering and decolorizing action of carbon derived from fibrous rice material from which the resins have been removed, substantially as described.

13. The process of removing the polyphenols from saccharine juices and increasing the yields of sugar therefrom which consists in subjecting said juices to the action of charred rice hulls from which the resins have been removed, and which contain carbon associated with silica, substantially as described.

14. The process of preparing a decolorizing carbon which comprises charring fibrous siliceous rice material, extracting from the charred material with alkali a material proportion of alkali-soluble constituents including substantially all the resinous matter, and stopping such extraction with alkali while the carbonaceous material still contains sufficient of its original siliceous content to form a support for the carbon present, substantially as described.

In testimony whereof I affix my signature.

HERBERT M. SHILSTONE.